US007497376B2

(12) United States Patent
Landwirth et al.

(10) Patent No.: US 7,497,376 B2
(45) Date of Patent: Mar. 3, 2009

(54) BUSINESS METHOD OF IMPLEMENTING AN AUTOMATED VAULT MACHINE

(75) Inventors: Donald M. Landwirth, 28 Selby La., Atherton, CA (US) 94027; Michael P. Levis, San Francisco, CA (US)

(73) Assignee: Donald M. Landwirth, Atherton, CA (US)

( * ) Notice: Subject to any disclaimer, the term of this patent is extended or adjusted under 35 U.S.C. 154(b) by 434 days.

(21) Appl. No.: 10/990,828

(22) Filed: Nov. 16, 2004

(65) Prior Publication Data

US 2005/0269404 A1 Dec. 8, 2005

Related U.S. Application Data

(60) Provisional application No. 60/578,336, filed on Jun. 8, 2004.

(51) Int. Cl.
*G06K 5/00* (2006.01)
*G07F 19/00* (2006.01)

(52) U.S. Cl. ........................ 235/382; 235/379; 235/380

(58) Field of Classification Search ................. 235/375, 235/382; 705/5; 70/63; 109/6, 56, 57
See application file for complete search history.

(56) References Cited

U.S. PATENT DOCUMENTS 5,219,386 A * 6/1993 Kletzmaier et al. ........... 70/277
5,475,376 A * 12/1995 Chikamitue et al. ........ 340/5.73
5,946,660 A * 8/1999 McCarty et al. ................ 705/5
6,129,029 A * 10/2000 Watson ........................ 109/56
6,344,796 B1 * 2/2002 Ogilvie et al. ........... 340/568.1
6,734,783 B1 * 5/2004 Anbai ....................... 340/5.52
6,961,707 B2 * 11/2005 Jenkins .......................... 705/5
7,221,273 B1 * 5/2007 Seyfarth .................. 340/545.1

* cited by examiner

*Primary Examiner*—Karl D Frech
*Assistant Examiner*—April A Taylor
(74) *Attorney, Agent, or Firm*—Morgan, Lewis & Bockius LLP

(57) ABSTRACT

A system and method for remotely managing a security area such as a safe deposit box repository providing ready access by a community of users includes one or more identity-confirmation steps, followed by granting permission to enter a first secure area. Within the first secure area, further identity-confirmation steps are performed before access to a second secure area is remotely authorized. Inside the second secure area, the user unlocks one mechanism which secures his specific safe deposit box and, if implemented in the particular vault, a second portion is remotely unlocked, permitting the user access to his box. Egress involves replacing the user's safe deposit box into the assigned location, then exiting to the first secure area. After the door between the second and first secure areas closes, exit from the first secure area is permitted. Identity-confirmation steps may include cards, PINs, biometric tests, visual identification, or other suitable steps.

43 Claims, 9 Drawing Sheets

BUSINESS METHOD OF IMPLEMENTING AN AUTOMATED VAULT MACHINE

CROSS-REFERENCE TO RELATED APPLICATIONS

This application claims the benefit of priority to U.S. Provisional Application No. 60/578,336 filed Jun. 8, 2004 and fully incorporated herein by reference for all purposes.

BACKGROUND OF THE INVENTION

1. Field of the Invention

The present invention relates to provisioning and management of secure facilities, and more particularly relates to provisioning and management of automated, remotely monitored secure facilities.

2. Description of Related Art

Historically, safe deposit boxes have been maintained in secure vaults located at local bank branches. Access to these safe deposit boxes has been controlled by manual processes. Typically, access to a safe deposit box requires the participation of at least one staff member of the local bank branch. The bank staff member must approve access to the vault and assist in the opening of the safe deposit boxes within the vault. Typically, the safe deposit boxes have a variety of form-factors and are stored in secure, locked compartments on shelves in the vault.

In a typical situation, a customer rents a safe deposit box from the local bank branch. In many implementations, the safe deposit box has two locks. The customer is issued a key unique to one of the locks, and the bank retains the key to the other lock. Only by using both keys can the safe deposit box can be extracted from its secure storage shelf in the vault for access by the customer.

Because at least one staff member must be present, access to safe deposit boxes is generally restricted to bank opening hours. Because the vault is located at the local bank branch, the customer has limited choice in the geographical location of the safe deposit box. Hence, customer access to safe deposit boxes is subject to severe limitations, and involves significant labor.

SUMMARY OF THE INVENTION

The present invention provides a novel business method and security system that eliminates many of the limitations traditionally associated with the provisioning of safe deposit boxes. The invention makes possible the location of safe deposit box facilities in locations which are geographically convenient to the customer and which provide the customer with substantially uninterrupted year-round access. Each of the secured vaults is remotely monitored at all times by security staff at a central location. In one exemplary implementation, security and safety of the customer's valuables are assured by a series of automated security checks, or zones, at the local facility, in combination with remote monitoring by trained security staff. In addition, the locking mechanisms traditionally opened by the bank in the prior art may be automated in the present invention. The automated local facility may thus be thought of as an automated vault machine, or AVM, and the remote security center, which may for example be regional, may be thought of as an RSC.

Customer access to an individual safe deposit box may, for example, require one or more PIN type access checks as well as biometric checks, followed by visual confirmation by the RSC. In an exemplary arrangement, once the customer has satisfactorily completed each of the security checks, the RSC remotely releases the "bank" lock on the individual safe deposit box, thus allowing the customer access to his valuables. In some implementations, private rooms within the AVM may be provided to allow the customer privacy. Ingress to the rooms may be remotely controlled for additional security and privacy.

In some embodiments of the invention, the RSC controls the operation and security of a plurality of geographically distributed AVMs. In a typical arrangement, RSCs are operated by trained, screened security staff and the functions performed by the RSC security staff are scripted, monitored and recorded. RSCs are connected to AVMs using multiple, redundant secure data communications links such that failure of one or more communications links will not prevent the AVM from continued operation.

The RSC monitors and controls security in all security zones through a plurality of access control means. The security staff at the RSC perform access control functions including visual monitoring of activities at the AVM, validation of forms of identification presented by a person seeking access, visual and biometric identification of the person seeking access, unlocking the doors of the AVM and unlocking the safe deposit box. The RSC security staff observe activities at AVMs through surveillance systems installed at the AVM. The surveillance systems include the access control systems, video cameras, transmitters and recorders and audio detection systems. Surveillance systems are located inside the AVM, outside the AVM and, in some embodiments, in the parking facilities associated with the AVM.

In some embodiments, the RSC security staff operate an emergency management system that is activated when a security threat is detected. Security threats exist when circumstances, events or intruders threaten the safety of a customer, the contents of the safe deposit boxes or the AVM itself. Criminal or suspicious activity, health issues, accident, earthquake, flood, wind, inclement weather or other acts of nature give rise to security threats. The RSC security staff, subject to written procedures, may dispatch a combination of fire, police, private security and other emergency services as necessary to eliminate the security threat.

In some embodiments, armed security staff may be dispatched upon request of a customer to escort the customer to and from the AVM. Alternatively, the armed security staff may be dispatched to guard the AVM while the customer is present in the vicinity of the AVM. In at least some of these inventions, armed escort and guard services are provided as a premium service in return for consideration from the customer.

In at least some embodiments, the RSC is operated 24 hours per day, on every day of the year. Should an RSC primarily associated with a particular AVM be rendered inoperative, other RSCs may be configured to automatically assume the responsibility of monitoring and controlling the AVM. The RSC controls all access to the AVM.

In an embodiment, the AVM includes a security system, a plurality of safe deposit boxes and a plurality of private rooms. The security system in the AVM combines components including, but not limited to, remote monitoring systems, physical security systems, access control systems, surveillance systems and emergency management systems.

The AVM is physically secured from unauthorized access. The AVM is designed to resist forcible entry and limit entry to authorized customers and staff members. In at least some embodiments, to gain entry to the AVM an authorized customer must traverse a secured anteroom bounded by two doors that cannot be simultaneously open. The customer enters the secured anteroom from outside the AVM through an exterior door, closes the exterior door and passes through an interior door into the interior of the AVM. Then the customer must locate and open a safe deposit box. Each step of the process is subject to access control measures designed to prevent unauthorized access to the secured anteroom, interior of the AVM or the interior of the safe deposit box.

In an exemplary embodiment, access control measures require a customer applying for entrance to the AVM to use a key card and access code to open the exterior security door and gain access to the enclosed secured anteroom. The interior door cannot be opened until the exterior door is closed and locked and the applicant has successfully responded to a security challenge. The security challenge may be a combination of signature analysis and any available biometric screening tests including, but not limited to, fingerprint analysis, iris scanning and analysis, a non-invasive DNA or blood typing analysis and face recognition. Additionally, entry to the interior of the AVM requires affirmative authorization by the RSC security staff following visual confirmation of the identity of the customer.

After a customer has successfully passed to the interior of the AVM and the interior door has been closed and locked, the customer's safe deposit box can be accessed. The access control system identifies the location of the customer's safe deposit box using an electronic display system on the outside of the safe deposit box. The customer uses a key or enters a pass code to request that the safe deposit box be opened and, in implementations which include a second lock controlled by the facility operator, the RSC issues electronic commands to release the safe deposit box. Customers must restore the safe deposit box to its proper location, in a locked condition, in order to exit the AVM facility. Should a customer attempt to access another safe deposit box, an alert is sent to the RSC and a response is initiated appropriate to maintenance of the security of the facility and the other safe deposit box.

The AVM security system provides surveillance of the interior and exterior of the AVM. Upon detection of a threat the security system or RSC personnel can dispatch law enforcement, private security, fire, paramedic, rescue or other services. The security system also supports display monitors within the AVM that permit customers to visually inspect the surrounding premises before exiting the AVM.

DETAILED DESCRIPTION OF THE INVENTION

Figure 1:
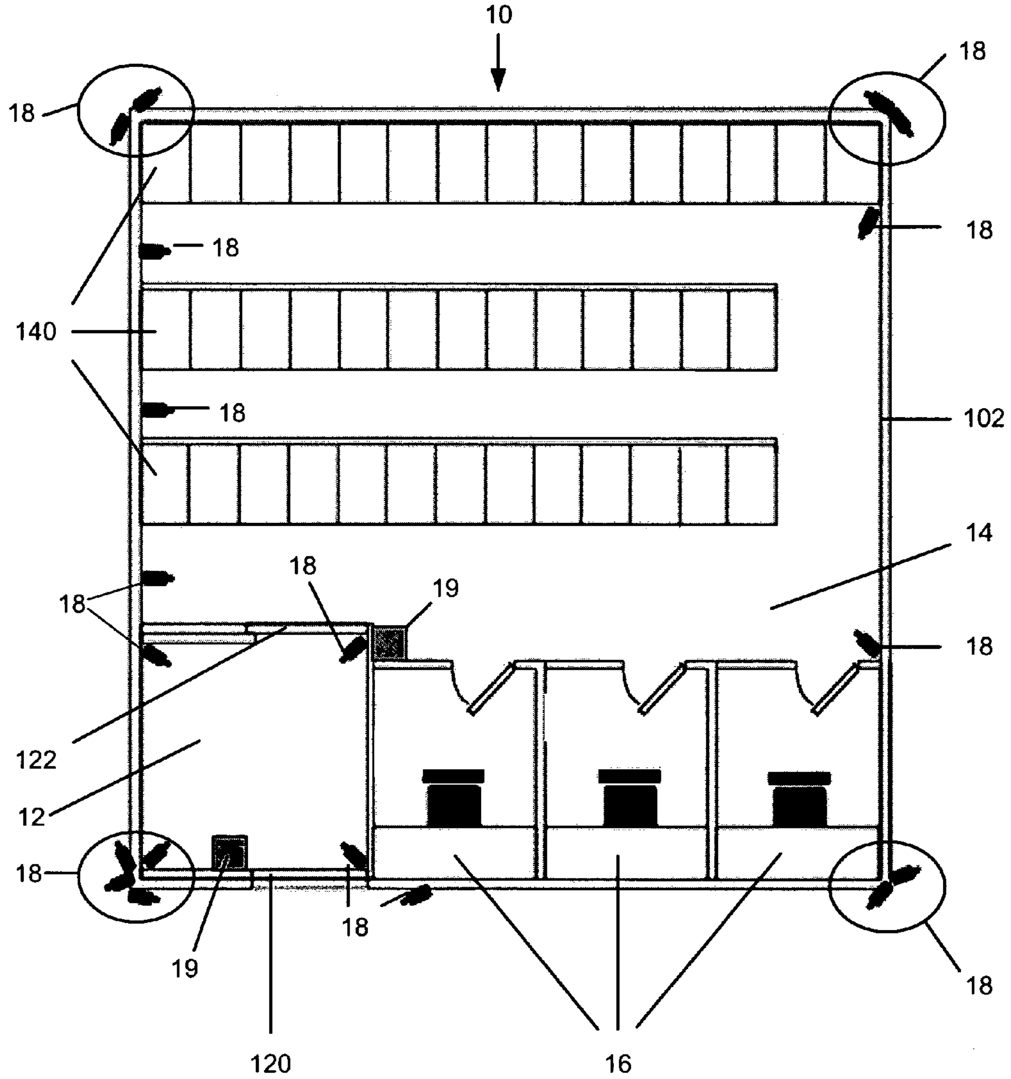
FIG. 1 shows the floor plan of an embodiment of the AVM.

Referring to FIG. 1, one implementation of an AVM, indicated generally at 10, is an enclosed structure 102 with a secured anteroom 12, an interior storage vault 14 and private work rooms 16. Video surveillance cameras 18 are located so as to provide video images of the interior and exterior of the AVM 10.

Figure 2:
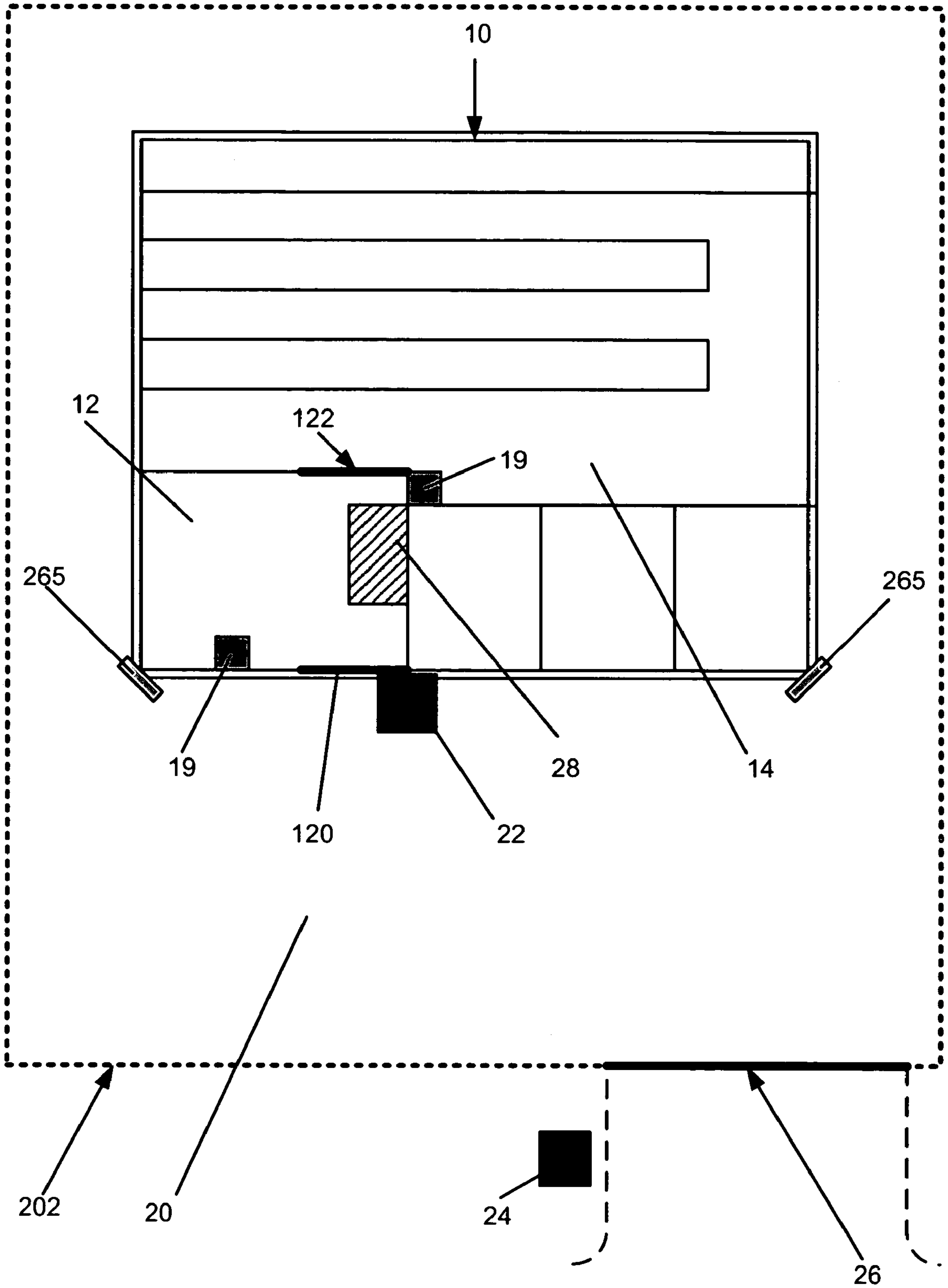
FIG. 2 shows an AVM with parking facility.

Referring now to FIG. 2, the secured anteroom 12 controls access to the storage vault 14 of the AVM 10. An exterior door 120 allows passage between the secured anteroom 12 and the exterior of the AVM. An interior door 122 allows passage between the secured anteroom 12 and the storage vault 14 within the AVM. A first security console 22 is located outside the AVM, adjacent to the exterior door 120. The first security console 22 is equipped with an apparatus to identify customers by, for example, the use of a magnetic card reader and a keycode entry keypad. In at least some embodiments, including the latter example, the first security console 22 automatically opens the exterior door 120 upon verification of the validity of the magnetic card and keycode.

After the exterior door 120 is opened, the customer enters the anteroom 12 and initiates an identification process at a second security console 28 by, for example, inserting a magnetic card into the second security console 28. The exterior door 120 closes as the identification process begins.

The second security console 28 permits biometric verification of the customer. Biometric verification includes, but is not limited to, retinal scan analysis, Raman spectroscopy, DNA validation, 2D or 3D video face or spatial recognition, 2D or 3D video full body or spatial recognition, 2D or 3D video partial body or spatial recognition, movement or gait recognition system, infrared recognition system, aura recognition system, electrical capacitance or other biometric current or resistance recognition system, voice recognition system, signature recognition system, pulse or EKG recognition system, weight recognition, hair pigment recognition, eye pigment recognition, other body pigment recognition, non-invasive tests (e.g. blood, sugar, insulin, triglycerides), breath test and saliva test. Upon satisfactory identity verification and visual inspection of the anteroom 12 by video surveillance cameras 18, RSC staff remotely cause the opening of the interior door 122.

At least some embodiments of an AVM 10 incorporate a secured parking facility 20. The secured parking facility 20 is surrounded by a fence or wall 202 and is monitored by video surveillance cameras 18. Access to the secured parking facility 20 is provided through a remotely operated gate 26, controlled by a third security console 24. Customers obtain access to the AVM 10 through the secured parking facility 20 by, for example, inserting a magnetic card into the third security console 24 and validating information contained on the magnetic card at a remote RSC.

Figure 3:
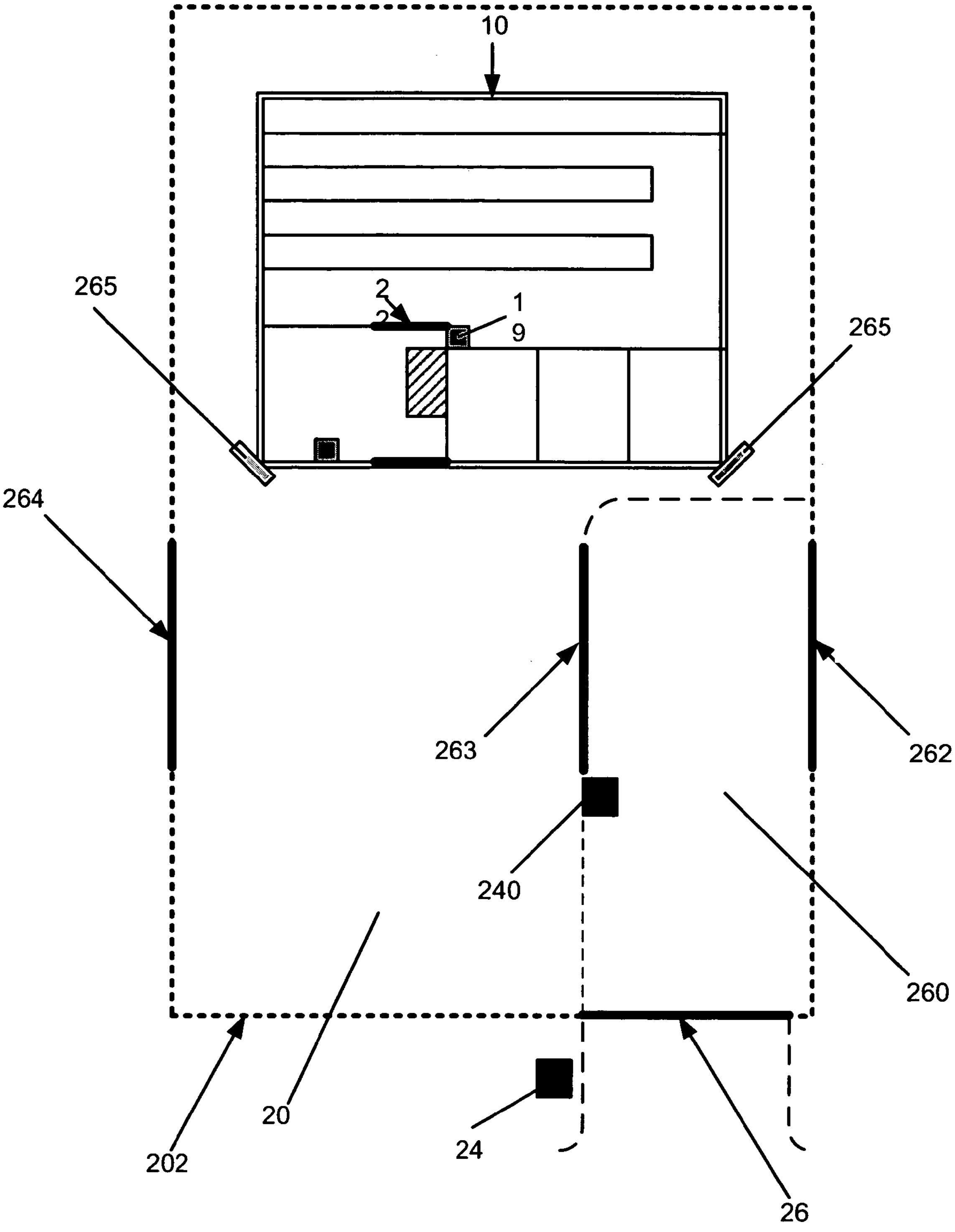
FIG. 3 shows an AVM parking facility with double-gated entry.

Referring now to FIG. 3, an exemplary implementation is depicted in which the security of a secured parking facility 20 is enhanced by the inclusion of one or more additional access gates. In this embodiment, an AVM 10 is completely enclosed within the parking structure 20. The parking structure 20 may be formed from strengthened walls or fences. Interior areas of the parking structure 20 and exterior areas adjacent to the parking structure 20 are monitored by surveillance equipment such as video cameras, motion detectors, etc. Access to the secured parking facility 20 is provided through a remotely operated first gate 26 and controlled by the third security console 24 (see also, FIG. 2). Having provided identifying information, the remote RSC validates the identifying information and opens the exterior gate 26 and the user passes into a vehicle holding area 260. The exterior gate 26 closes and a fourth security console 240 may confirm the identity of the customer, monitor the vehicle holding area 260 or otherwise detect the presence of unauthorized persons in the vehicle holding area 260. For example, staff at the remote RSC typically perform a visual inspection of the holding area before the customer may proceed to the AVM 10. In some embodiments, the customer exits the vehicle and applies for entry at the AVM 10. Upon the customer's return to the vehicle, in these embodiments, the RSC remotely opens a second gate 262 and the user exits the parking structure 20 through the second gate 262. In some other embodiments, following identification at the fourth console 240, a third gate 263 is opened by remote control by the RSC and the vehicle passes into the interior of the parking structure 20. In the latter embodiment, the vehicle may exit the parking structure through a fourth gate 264, through the vehicle holding area 260 or through a series of other gates (not shown) according to the security requirements of the AVM operator.

Figure 4:
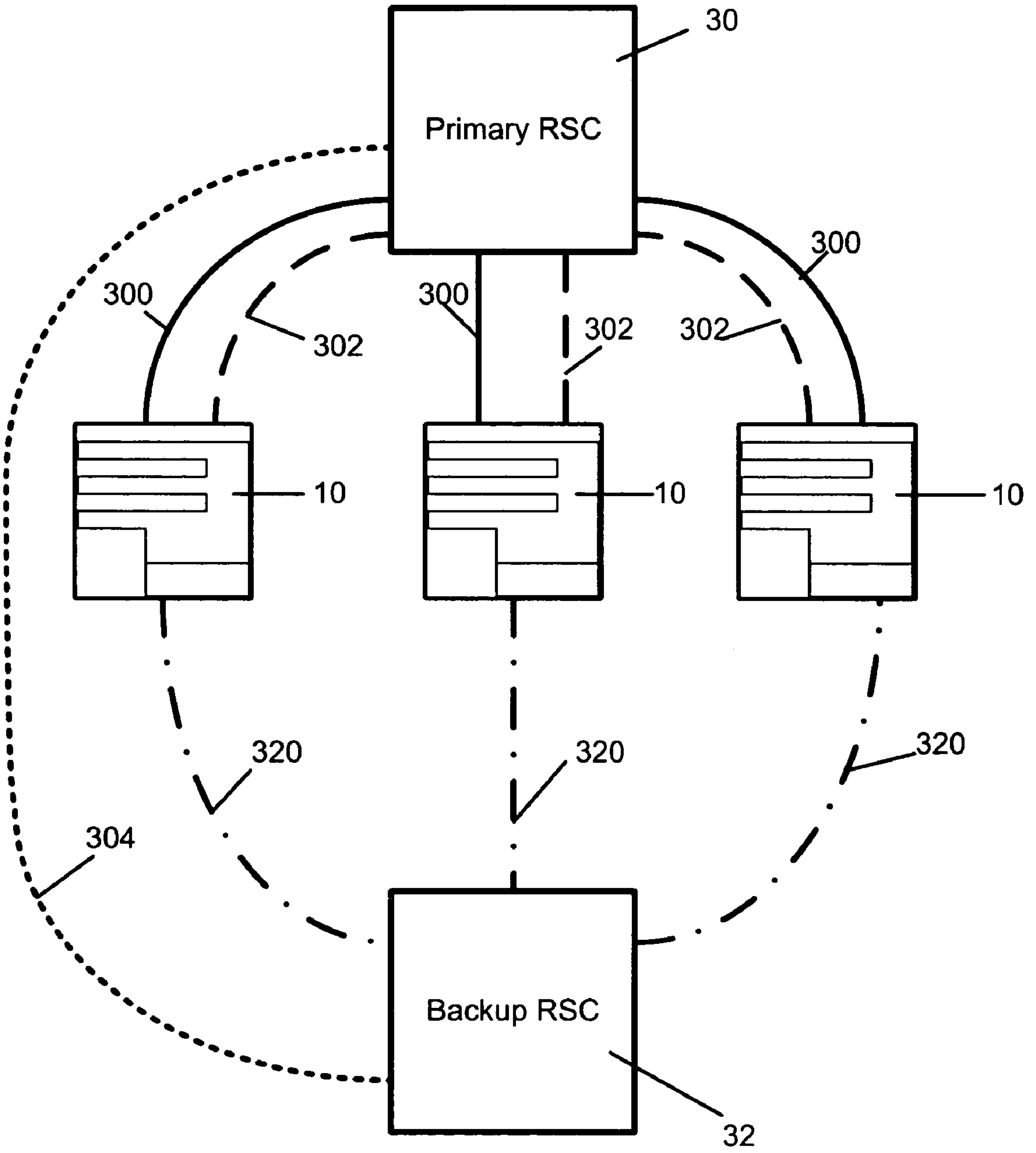
FIG. 4 shows the structure of the network of AVMs and RSCs.

In an exemplary embodiment, as shown in FIG. 4, the AVM 10 communicates with a primary RSC 30 over a primary data communications link 300 and a secondary communications link 302. The primary data communications link 300 uses a first communications means for transmitting data and the secondary data communications link 302 uses a second communications means for transmitting data. The first and second communications means may be selected from a group that includes, but is not limited to, leased telecommunications lines, DSL, leased fiber optic, dedicated fiber optic, dialup modem, CATV, microwave, cellular, mesh wireless and satellite or any other suitably secure and reliable communications technology or service.

In some embodiments, a tertiary data communications link 320 connects the AVM 10 with a secondary RSC 32 that serves as backup to the primary RSC 30. The tertiary data communications link 320 uses any available data communications means including, but not limited to, leased telecommunications lines, DSL, leased fiber optic, dedicated fiber optic, dialup modem, CATV, microwave, cellular, mesh wireless and satellite or any other suitably secure and reliable communications technology or service.

The primary RSC 30 is also directly connected to one or more secondary RSCs 32 by means of an inter-RSC data communications link 304 that permits coordination and detection of primary RSC 30 failure. The inter-RSC data communications link 304 uses any available data communications means including, but not limited to, leased telecommunications lines, DSL, leased fiber optic, dedicated fiber optic, dialup modem, CATV, microwave, cellular, mesh wireless and satellite or any other suitably secure and reliable communications technology or service. In the event that the primary RSC 30 fails or otherwise becomes unreachable, the backup RSC 32 attempts to establish command and control over the AVM 10, using the tertiary data communications link 320. If desired, security staff in the backup RSC 32 simultaneously attempt voice contact with the primary RSC 30 and, if necessary, dispatch technical or security services to the primary RSC 30.

Figure 5:
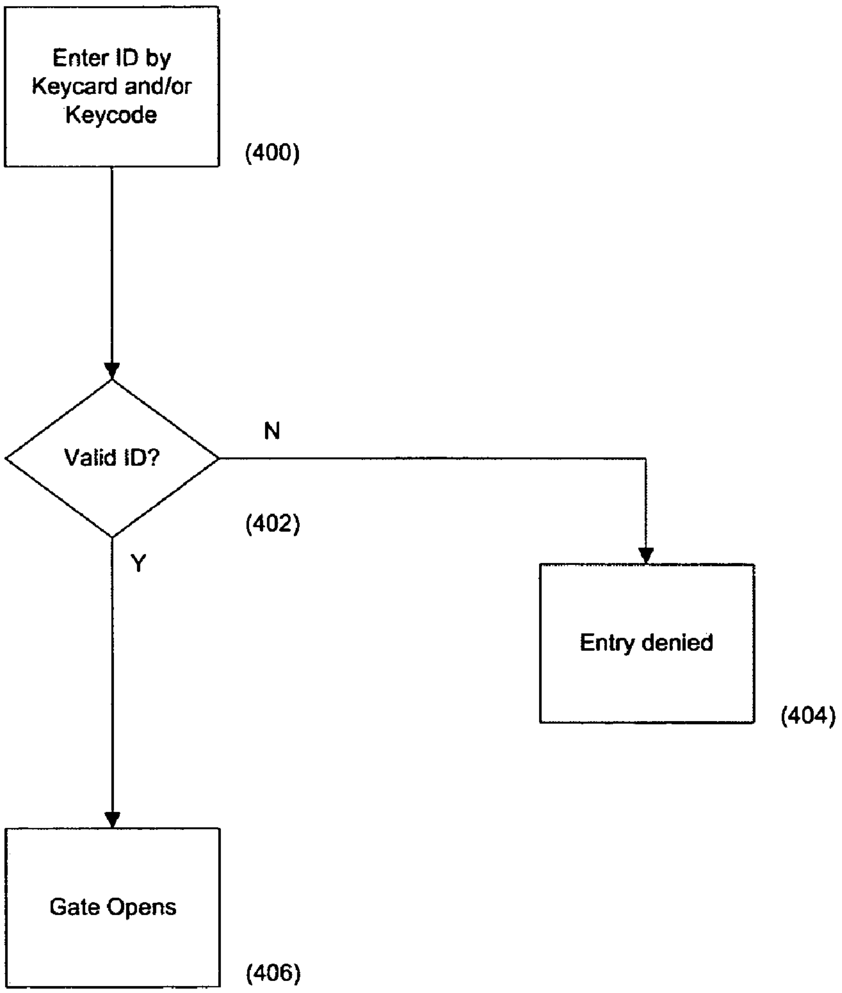
FIG. 5 is a flowchart of the access protocol for AVM secured parking.

Referring to the exemplary AVM 10 shown in FIGS. 2 and 4 and the associated flowchart shown in FIG. 5, a customer seeking access to a secured parking facility 20 attached to an AVM 10, provides identifying information such as a combination of keycard and keycode, as shown at step 400, at an entry terminal 24, located adjacent and exterior to the parking facility gate 26. In some embodiments, the keycard and keycode are validated automatically at step 402 by reference to one or more databases that may be maintained at locations including an RSC 30, at the AVM 10, and commercial verification services. In other embodiments, the keycard and keycode may also be validated by security staff at the RSC 30. Where the keycard or keycode is determined to be invalid at step 404, the parking facility gate 26 remains closed and entrance is denied; otherwise, if the keycard and keycode are determined to be valid at step 406, the parking facility gate 26 opens and the customer is permitted to enter the parking facility 20.

Figure 6:
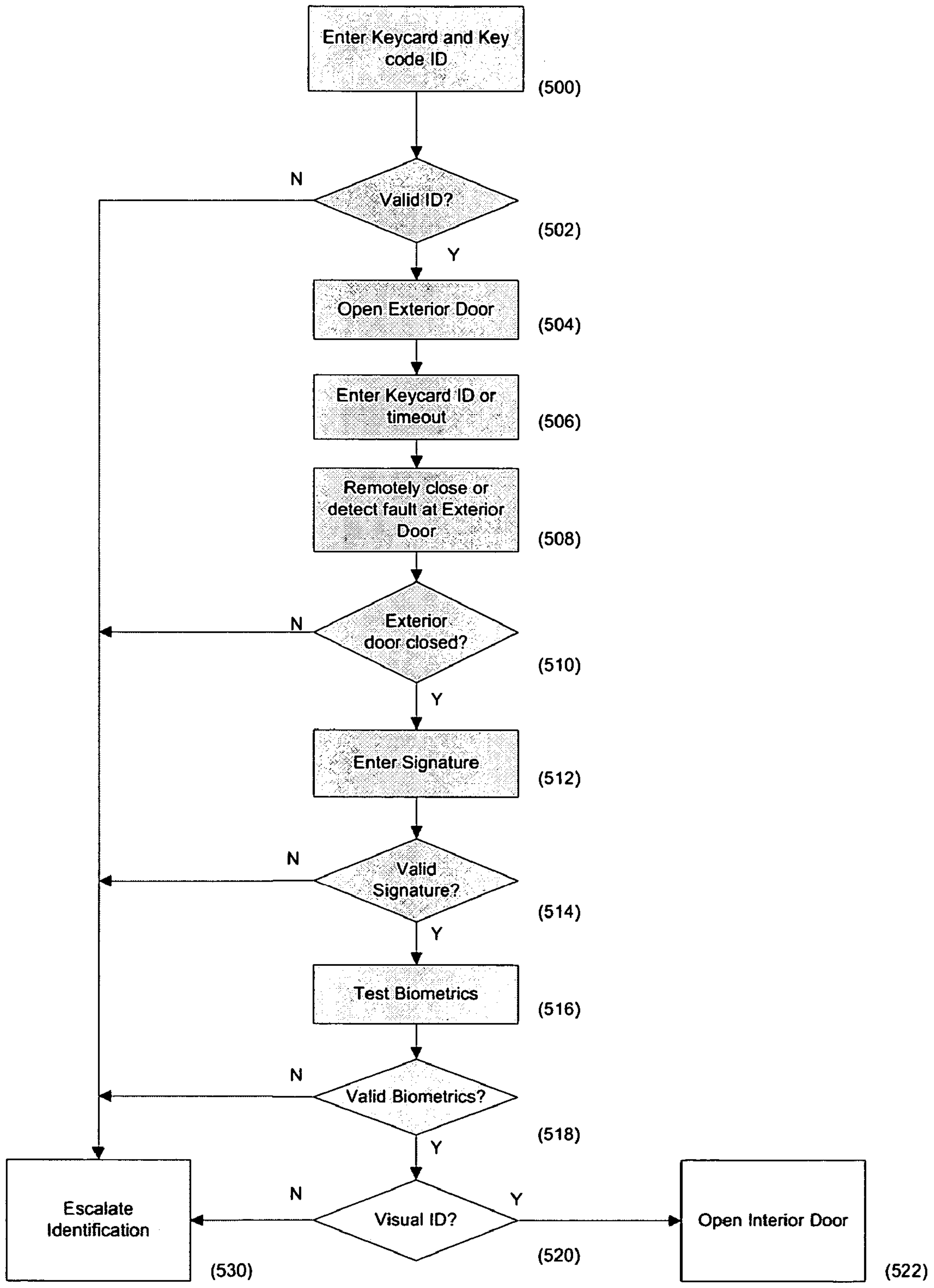
FIG. 6 is a flowchart of the access protocol for an AVM.

Referring now to FIGS. 2 and 6, the flowchart of FIG. 6 shows the procedure followed by a customer seeking access to the AVM 10 in the exemplary embodiment of FIG. 2. The process begins at step 500, when the customer enters a keycard and keycode at a first AVM security console 26, located next to the AVM exterior door 120. The keycard and keycode are validated by the RSC at step 502 and, if the keycard or keycode is not valid as shown at step 502, the AVM exterior door 120 remains closed, entrance is denied and an identification escalation procedure is initiated, as shown in step 530. The RSC manages the identification escalation procedure of step 530 and attempts to identify the cause of the identification failure. If the identification of step 502 is valid, the AVM exterior door 120 opens, as shown at step 504, and the customer enters the AVM secured anteroom 12.

Next, at step 506, the customer enters the keycard in a second security console 28 in the secured anteroom 12 and the AVM exterior door 120 closes at step 508. If the door fails to close, as shown in step 510, the escalation procedure of step 530 is initiated. Otherwise, when the security system determines that the AVM exterior door 120 is closed as shown at step 510, the customer's signature is obtained electronically at step 512 by the second security console 28. The RSC determines, at step 514, whether the signature is valid. If the signature is not valid, the RSC follows the escalation procedure as shown at step 530. However, if the RSC validates the signature, the process advances to step 516, where one or more biometric identification tests are performed.

At step 518, the RSC compares the biometric test results with archived validated examples of prior customer tests. The comparison is, in at least some embodiments, automated such that no human verification is required; however, manual verification may be used in some implementations. If the RSC determines that the new results are inconsistent with the prior examples, then the RSC follows the escalation procedure shown at step 530. If the test results are consistent with the prior examples, then at step 520 a security staff member may observe the customer and the entire secured anteroom 12 through video cameras 18. If the RSC security staff member is satisfied that the customer identity has been accurately confirmed, then the AVM interior door 122 is opened, as shown at step 522. However, if the RSC security staff member is suspicious of the circumstances observed in the secured anteroom, then the RSC follows the escalation procedure of step 530.

Figure 7:
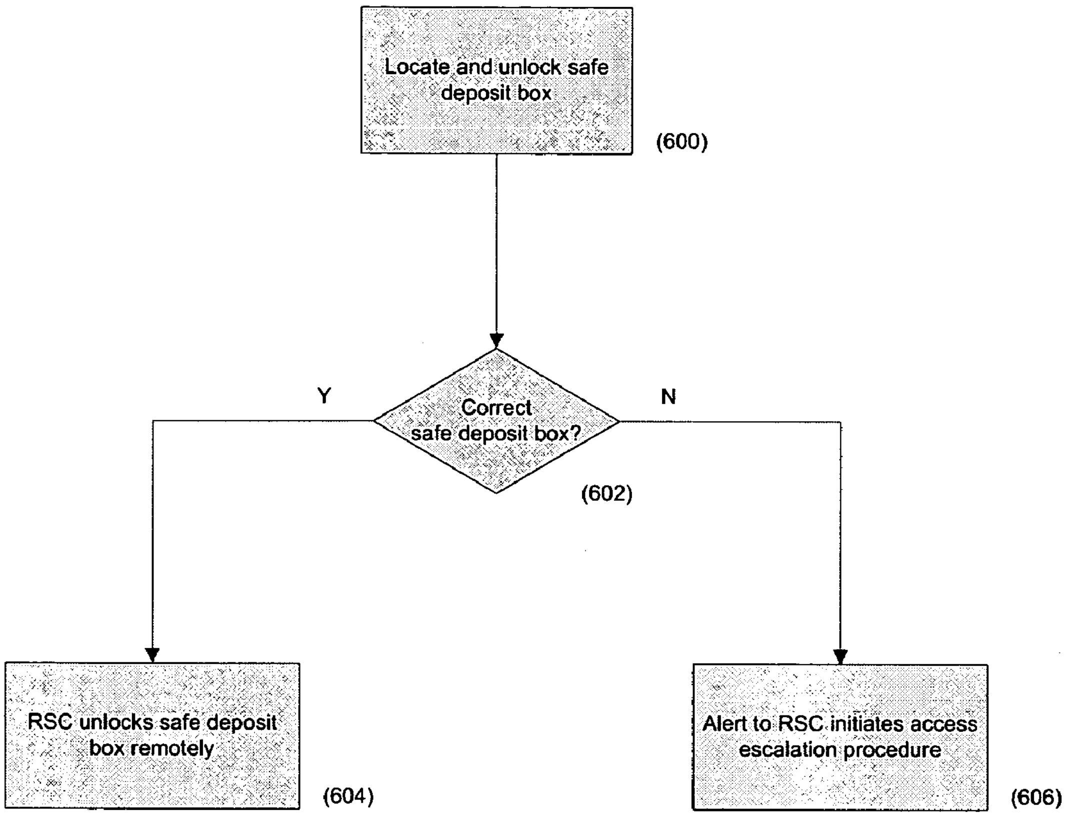
FIG. 7 is a flowchart of the access protocol for a safe deposit box.

Referring now to FIGS. 2 and 7, after a customer is admitted to the AVM vault 14 the customer locates his assigned safe deposit box and unlocks "his" lock as shown in step 600. The RSC confirms, at step 602, that the customer has unlocked the correct safe deposit box and subsequently, at step 604, remotely unlocks the AVM-controlled second lock on that safe deposit box. In some embodiments, the AVM-controlled lock on each safe deposit box has associated therewith a unique unlock code, to ensure that only that safe deposit box is unlocked. If, as shown at step 606, the customer attempts to unlock a safe deposit box other than one authorized, then the RSC follows the escalation procedure 530, in which the RSC intervenes to redirect the customer or remove him from the vault, as appropriate. It will be appreciated that an AVM-controlled second lock may not be required in all implementations.

Figure 8:
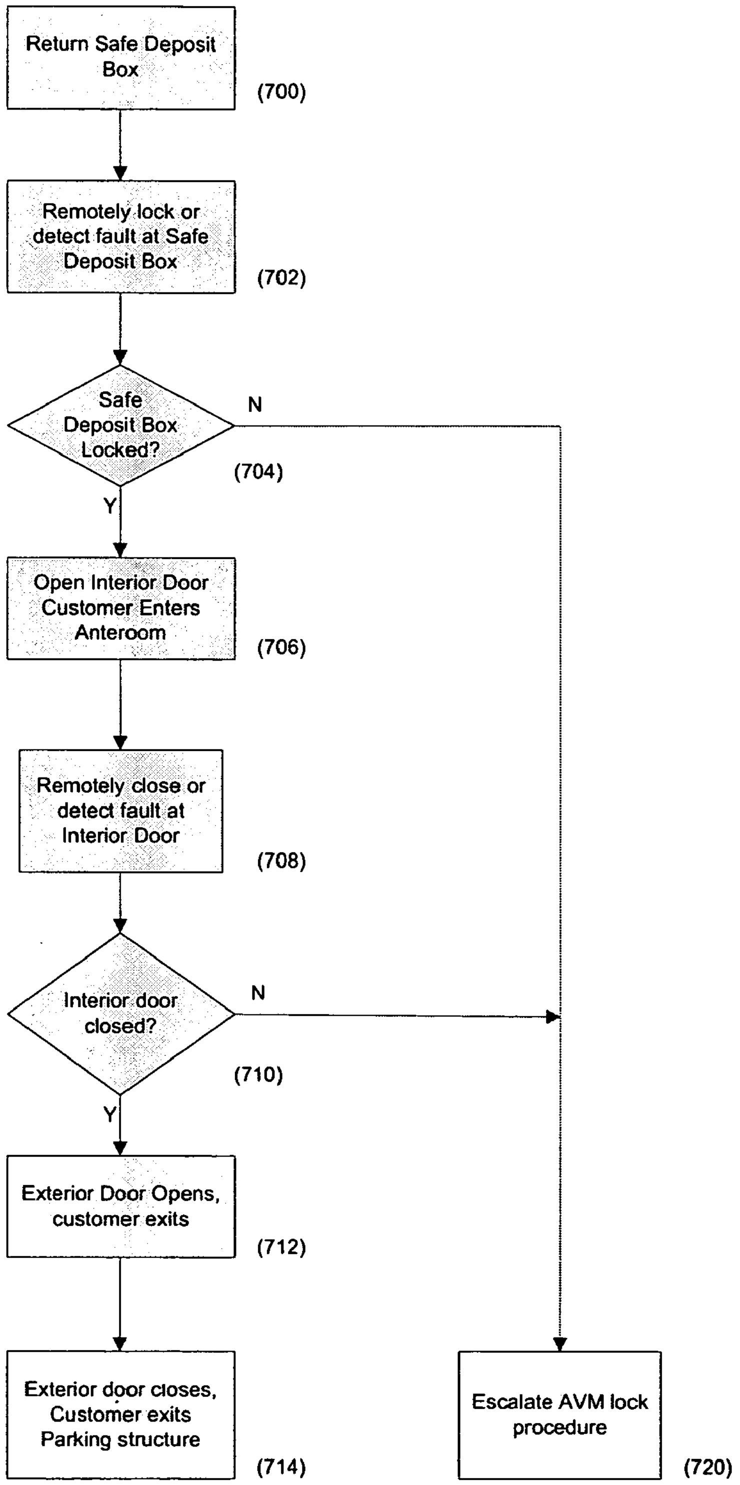
FIG. 8 is a flowchart of the AVM exit protocol.

With further reference to the exemplary embodiment of FIG. 2, in combination with FIG. 8, the exit process may be better understood. The process begins at step 700 when, for the illustrated implementation, the customer returns the safe deposit box to its assigned storage location. It will be appreciated that a removable box may not be provided in all instances. Instead, for example for larger boxes, the customer may gain access to his items simply by opening a door to his safe deposit box. Using either approach, at step 702 the customer locks the box in any manner appropriate for the customer's box and lock, for example by removing the key. Failure to return and lock the safe deposit box within a selected interval of time, as shown in step 704, results in the initiation of an escalation procedure, shown in step 720, that causes the RSC to intervene to secure the AVM 10 and its contents. Removal of the key, or other locking process, alerts the RSC, as shown at step 704, causing the interior AVM door 122 to be opened. Then, at step 706, the customer emerges from the vault area 14 into the secured anteroom 12 and waits while the interior door 122 closes, as shown at step 708. When the interior door 122 is fully closed as shown at step 710, the RSC opens the exterior AVM 120 door as shown at step 712, and the customer exits the AVM. The exterior door of the AVM 120 closes as shown at step 714. If the AVM includes a secured parking facility, the customer exits the parking structure gate 26 which typically opens automatically when a car approaches the exit from inside the parking structure 20. In addition, video cameras 18 may be provided together with video monitors 19 inside the secure anteroom 12 or the vault 14 to permit the customer to observe the exit and the parking area to ensure that his egress from the facility is safe.

In embodiments of the invention, security guards may provide on-site security at an AVM. Typically, the security guards are armed. In some of these embodiments, the security guards may be present at predetermined times. In at least some of these embodiments, the security guards are dispatched to provide security at the request of a customer. The security guards may also be engaged by customers as an escort to and from the AVM. Services of the security guards are typically provided under contractual arrangement between the customer and operators of the AVM and are typically presented as a premium service.

Figure 9:
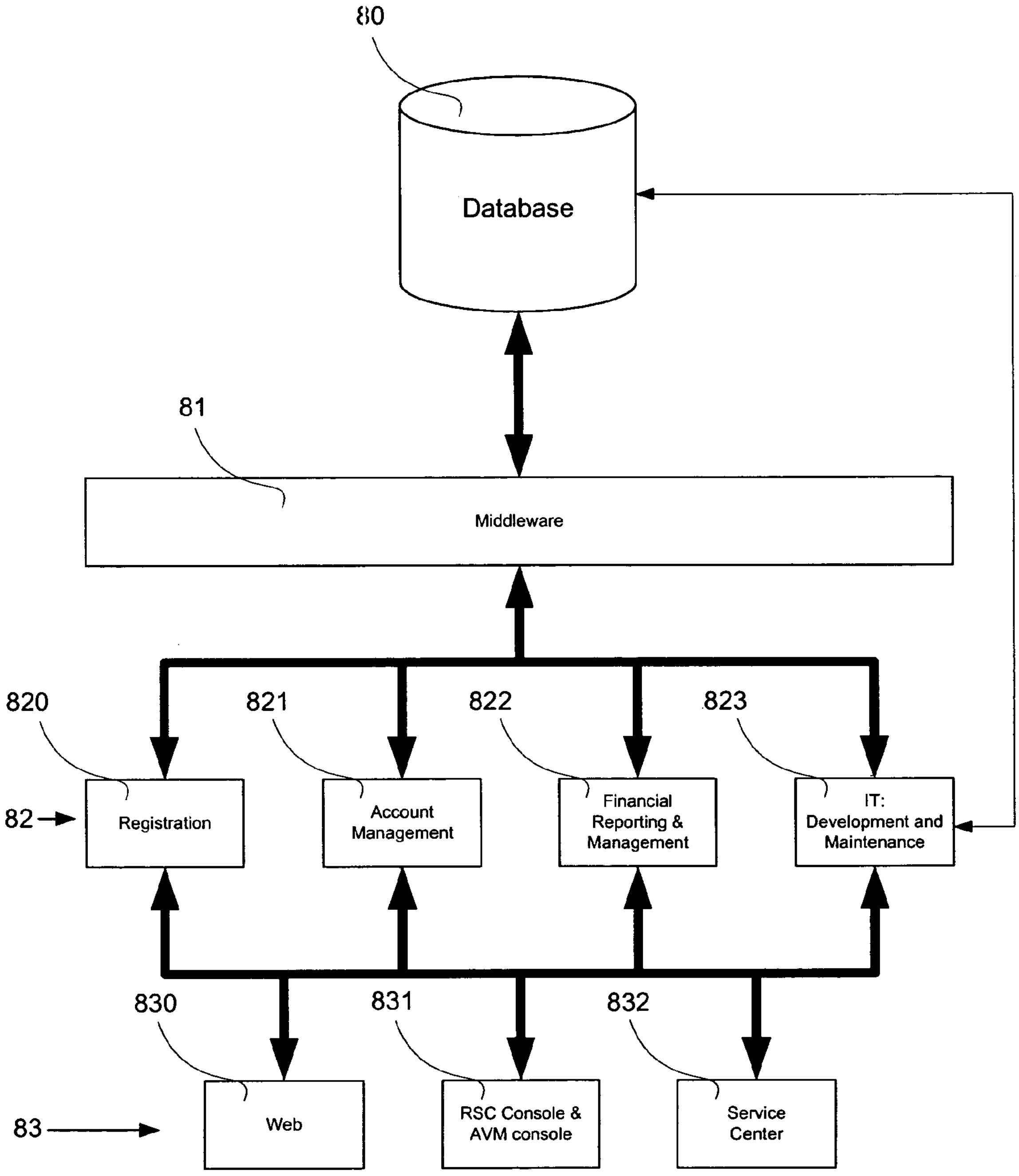
FIG. 9 shows an exemplary database system used to manage a network of AVMs.

FIG. 9 provides a representation of an exemplary system used to facilitate management of a network of AVMs. Typically, database 80 maintains management information and provides data used in controlling access to an AVM by a customer. The database may be constructed using any appropriate database management system ("DBMS"), typically a commercially available relational DBMS such as Oracle, IBM DB2 or Microsoft Access. In some embodiments the database 80 is formed by conjoining a plurality of databases of various origin, where each of the plurality of databases is used to manage a particular aspect of AVM system operational data. For example, accounting data may be maintained on a database designed for financial application while a custom Microsoft Access database may be used to track maintenance records for AVM security equipment. It will therefore be appreciated by those skilled in the art that the database 80 may be one or more databases, each maintained separately on the same or different servers or other systems.

Middleware 81 is provided in the example to facilitate access to the database 80. The middleware 81 is typically a combination of standards-based software and other software tools where the middleware 81 customized and adapted to secure the database 80 and provide advanced user authentication capabilities. For example, typical middleware 81 includes one or more SQL server components, applications to store, insert, delete, update and retrieve data from the database 80 and applications to translate data between financial and other applications, including web-based user interface tools.

It will be appreciated that while the middleware 81 provides consistent, uniform methods of accessing the database 80, software components other than the middleware may connect front end applications to the database 80 directly using a combination of proprietary and standards-based tools. Typically, the tools will implement industry standards including ODBC, RPC, WMI, SNMP and OLAP. Direct access of the database may be provided for performance, security, reporting, troubleshooting and other reasons.

In an exemplary embodiment, a tier of application-specific software, indicated generally at 82, operates on data obtained from operation of the network of AVM and from the database 80. As described above, the middleware 81 facilitates access to the data obtained from the database 80. Operational data is obtained from a variety of sources, including security systems (such as security consoles at AVMs), data entry systems provided for customer support and data entry systems operated by security staff located in regional security centers.

Four application-specific software components are shown as part of the tier 82 in the simplified example of FIG. 9: Registration 820, Account Management 821, Financial Reporting and Management 822, and IT Development and Maintenance 823. It will be appreciated that each of the application-specific software components in the tier 82 may itself be multi-tiered, depending on the configuration of other application-specific software to manipulate and otherwise preprocess data and, in turn, to provide processed data to other software, for example to downstream application-specific software. The application-specific software 82 also communicates, in the exemplary arrangement shown in FIG. 9, with another tier of software, indicated generally at 83 and generally encompassing user-interface applications (for both the customer and the operator), which may include web based applications 830, RSC and AVM console 831 and service center software 832.

In the example, registration software 820 processes new account requests. The registration software 820 automates a registration process by receiving registration requests from users through an Internet Web Application 830, by operator entry using a telephone service center application 832, or by any other suitable method. For example, the registration software 820 may also receive input from console software 831 when a new user first visits an AVM. Information typically gathered by the registration software 820 includes customer name and address, payment information (e.g. credit card information), one or more AVM locations from which customer desires service, type and quantity of safe deposit box, identity of additional persons authorized to use safe deposit box, service level authorized for additional persons (e.g. administrative, access only, box specific, site specific, etc.) and collection of authentication information such as temporary pass codes and responses to challenges (e.g. mother's maiden name, date of birth, etc.).

During the customer's first visit to an AVM, the registration software 820 also collects baseline biometric data by directing the customer to use a biometric device at a console in the AVM. The baseline biometric data may be assumed to provide sufficient and accurate identification of the customer because, at the time of collection of this baseline biometric data, the new customer has yet to be granted access to a safe deposit box. Therefore, subsequent access to the new customer's safe deposit box will be granted only to a person whose biometric data matches the collected baseline biometric data. It will be appreciated, however, that alternative embodiments may require that a customer provide baseline biometric data at a designated collection station or that the customer provide access to certifiable biometric data collected by a third party.

Additionally, the registration software 820 typically generates temporary pass codes and assigns a safe deposit box as required by the customer. Registration software 820 typically causes a registration packet to be transmitted to the customer by any combination of methods including postal service, courier, express package and Email. In the exemplary arrangement, the customer receives a cardkey as part of the registration packet. The customer is directed to visit the AVM and use the cardkey to complete the registration process. Use of the cardkey causes the registration software 820 and other application software to retrieve the customer's information from the database 80. A staff member at an RSC is alerted to the presence of the new customer and, using video feed and various AVM consoles and associated software 831, captures or updates customer information including passcodes, signatures, a baseline video image for identifying the customer and biometric information.

In the exemplary embodiment, RSC console software 831 provides information used to assist RSC staff in controlling activity at an AVM. The RSC console software 831 typically receives keycard and other identifying information when a customer enters the AVM and obtains customer records, registration information and other data from various sources including the database 80 and application-specific software 82. The RSC console software 831 assists the RSC staff to process the customer through functions including:

- selecting a preferred live camera feed,
- watching for status of exterior and interior doors using RSC Console's computer monitor,
- matching the customer's live video image to the stored baseline image,
- obtaining and validating the customer's signature using a digital signature pad,
- obtaining and validating biometric test results,
- selecting and presenting appropriate security challenges,
- opening and closing remotely-controlled doors,
- verifying that the customer has opened a first lock on an appropriate safe deposit box, and
- remotely opening a second lock on the appropriate safe deposit box.

In the exemplary embodiment, account management software 821 operates in conjunction with other application-specific software to maintain current profiles of each customer. Financial reporting and management 822 software provides business management functions, including accounting, billing and financial reporting. IT development and maintenance software 823 provides tools for technical support functions including upgrade, troubleshooting and testing of systems.

The tier of user interface support software, indicated generally at 83, provides functionality to support interaction between RSC staff and customers. As discussed above, these applications use identifying information to obtain information concerning an identified customer including records, account information, security information and identifying information. Customer service center software 832 provides information from the database 80 and from other applications that facilitates telephonic or web-based support of customers.

Having fully described an exemplary embodiment of the invention as well as a number of alternatives, it will be apparent to those skilled in the art, given the teachings herein, that numerous alternatives and equivalents exist which are within the scope of the appended claims. As a result, the foregoing description is not intended to be limiting, and it is the applicants' intent that they be accorded the full scope of the appended claims.

What is claimed is:

1. A system for securely storing safe deposit boxes, comprising:

- at least one automated vault adapted to store safe deposit boxes;
- at least one remote security center that monitors and controls activities at one or more automated vaults; and,
- a communications network which interconnects the secure automated vault to the remote security center;
- wherein the secure automated vault includes an internal storage vault adapted to store a plurality of safe deposit boxes, a secure anteroom attached to the entrance of the storage vault, a first remotely controlled door connecting the storage vault to the secure anteroom and a second remotely controlled door that connects the secure anteroom to the exterior of the automated vault.

2. The system of claim 1 wherein the secure anteroom contains a first security console equipped with a first test apparatus that performs primary identification tests.

3. The system of claim 2 wherein the first test apparatus transmits results of the primary identification tests to the remote security center using the communications network.

4. The system of claim 1 wherein a second security console is located exterior to the secure anteroom, adjacent to the second remotely controlled door, the second security console being equipped with a second test apparatus that performs secondary identification tests.

5. The system of claim 4 wherein the second test apparatus transmits results of the secondary identification tests to the remote security center using the communications network.

6. The system of claim 1 wherein the first and second remotely controlled doors are monitored and operated by the remote security center.

7. The system of claim 1 wherein the automated vault also includes a plurality of privacy rooms that are accessed from within the internal storage vault through lockable privacy doors.

8. The system of claim 7 wherein the lockable privacy doors are controlled and monitored from the remote security center.

9. The system of claim 1 wherein the secure automated vault is accessed through a secure parking facility.

10. The system of claim 9 wherein the secure parking facility is accessed through a remotely controlled gate.

11. The system of claim 10 wherein a third security console is located exterior to the secure parking facility, adjacent to the remotely controlled gate, the third security console being equipped with a third test apparatus that performs tertiary identification tests.

12. The system of claim 11 wherein the remotely controlled gate is monitored and controlled by the remote security center.

13. The system of claim 11 wherein the third test apparatus transmits results of the tertiary identification tests to the remote security center using the communications network.

14. The system of claim 1 wherein each of the plurality of safe deposit boxes is secured in the security vault using an associated locking apparatus controlled by the remote security center.

15. The system of claim 14 wherein the locking apparatus includes a first lock controlled by the remote security center.

16. The system of claim 14 wherein the locking apparatus includes a second lock operated by a combination of mechanical keys and electronic keys.

17. A system for remotely managing a security area, wherein the security area includes an enclosed area, an exterior area located on the outside of the enclosed area, an anteroom connecting the enclosed area and the exterior area and a plurality of remotely controlled doors arranged to control access between the enclosed area, the anteroom and the exterior area, the system comprising:

surveillance equipment configured to provide surveillance information related to the enclosed area, the anteroom and the exterior area;

lockable storage devices maintained within the enclosed area;

a plurality of access control devices configured to receive identifying information from a user;

one or more remote security centers adapted to receive the surveillance information and the identifying information, and further adapted to validate the identifying information and further adapted to operate the remotely controlled doors and to control access to the lockable storage devices; and, a network adapted to couple the security area to the one or more remote security centers and further adapted to connect each of the one or more remote security centers to another of the one or more remote security centers.

18. The system of claim 17 wherein the surveillance equipment includes microphones, video cameras and motion sensing devices.

19. The system of claim 17 wherein the one or more remote security centers are adapted to maintain reference information, wherein the reference information is used to validate the identifying information.

20. The system of claim 17 wherein the identifying information includes retinal scan analysis, fingerprint analysis, Raman spectroscopy, DNA validation, video face recognition, spatial recognition, video full body recognition, video partial body recognition, movement recognition, gait recognition system, infrared recognition system, aura recognition system, electrical capacitance, current and resistance recognition systems, voice recognition system, signature recognition system, EKG recognition system, weight recognition, hair pigment recognition, eye pigment recognition, other body pigment recognition, non-invasive blood tests, breath test and saliva test.

21. The system of claim 17 wherein the lockable security devices are safe deposit boxes, each safe deposit box having at least one lock operated remotely from the remote security center.

22. The system of claim 21 wherein the safe deposit boxes have at least one lock operated by a combination of mechanical keys and electronic keys.

23. The system of claim 21 wherein the at least one lock operated remotely from the remote security center is released only for an individual safe deposit box.

24. The system of claim 17 wherein the enclosed area also includes a plurality of privacy rooms that are accessed from within the enclosed area through lockable privacy doors.

25. The system of claim 17 wherein the security area is accessed through a secure parking facility.

26. The system of claim 25 wherein the secure parking facility is accessed through a remotely controlled gate.

27. The system of claim 26 wherein at least one of the plurality of access control devices is located exterior to the secure parking facility, adjacent to the remotely controlled gate.

28. The system of claim 27 wherein the remotely controlled gate is monitored and controlled by the one or more remote security centers.

29. The system of claim 17 further comprising: an access control system configured to identify the location of a particular safe deposit box; and an electronic display system on the outside of the safe deposit box, which is activated by the access control system only for that particular safe deposit box.

30. A method for remotely managing an automated vault, the automated vault including an anteroom, an internal storage vault connected to the anteroom, a first remotely operated door providing access from the exterior of the automated vault to the anteroom and a second remotely operated door providing passage between the anteroom and the internal vault, wherein the automated vault is adapted to store safe deposit boxes and further adapted to communicate with a remote security center, that is configured to monitor activities at the automated vault, the method comprising the steps of:

receiving a first set of identifying information presented by an applicant and validating the first set of identifying information to determine whether the applicant is an authorized user of the automated vault;

if the applicant is an authorized user, opening the first remotely controlled door to provide the applicant entry to the anteroom and closing the first remotely controlled door after the applicant has entered the anteroom;

receiving a second set of identifying information presented by the applicant and permitting the applicant to enter the automated vault;

opening the second remotely controlled door to provide the applicant entry to the automated vault and closing the second remotely controlled door after the applicant has entered the automated vault;

directing the applicant to a safe deposit box associated with the applicant;

providing access to the contents of the associated safe deposit box; and facilitating applicant's departure from the automated vault by sequentially securing the associated safe deposit box, opening the second remotely controlled door, locking the second remotely controlled after the applicant has reentered the anteroom, opening the first remotely controlled door and closing the first remotely controlled door after the applicant has exited the anteroom.

31. The method of claim 30 wherein the remote security center monitors activity using a plurality of surveillance equipment including microphones, video cameras and motion sensing devices.

32. The method of claim 30 wherein the first set of identifying information is received from a first test apparatus that performs identification tests.

33. The method of claim 30 wherein the first set of identifying information includes a combination of passwords, RF transponders, magnetic cards, retinal scan analysis, fingerprint analysis, Raman spectroscopy, DNA validation, video face recognition, spatial recognition, video full body recognition, video partial body recognition, movement recognition, gait recognition system, infrared recognition system, aura recognition system, electrical capacitance, current and resistance recognition systems, voice recognition system, signature recognition system, EKG recognition system, weight recognition, hair pigment recognition, eye pigment recognition, other body pigment recognition, non-invasive blood tests, breath test and saliva test.

34. The method of claim 30 wherein the second set of identifying information is received from a second test apparatus that performs identification tests.

35. The method of claim 30 wherein the second set of identifying information includes a combination of passwords, RF transponders, magnetic cards, retinal scan analysis, fingerprint analysis, Raman spectroscopy, DNA validation, video face recognition, spatial recognition, video full body recognition, video partial body recognition, movement recognition, gait recognition system, infrared recognition system, aura recognition system, electrical capacitance, current and resistance recognition systems, voice recognition system, signature recognition system, EKG recognition system, weight recognition, hair pigment recognition, eye pigment recognition, other body pigment recognition, non-invasive blood tests, breath test and saliva test.

36. The method of claim 30 wherein validating the first set of identifying information includes comparing the first set of identifying information with reference data associated with a plurality of authorized users, the reference data being maintained by the remote security center.

37. The method of claim 30 wherein permitting the applicant includes identifying the applicant by comparing the first set of identifying information with the reference data and obtaining access rights based on the identification of the applicant.

38. The method of claim 30 wherein directing the applicant includes providing visual indicators adjacent to and upon the safe deposit box and audible indicators projecting a combination of verbal instructions and directional signals leading to the safe deposit box.

39. The method of claim 30 wherein providing access to the contents includes receiving indication that the applicant has unlocked a first lock on the deposit box and causing a second lock to be unlocked by remote control.

40. The method of claim 39 wherein securing the associated safe deposit box includes receiving an indication that the applicant has locked the first lock and causing the second lock to be locked by remote control.

41. The method of claim 30 wherein the step of directing the applicant to the associated safe deposit box comprises: activating an electronic display system on the outside of the associated safe deposit box.

42. The method of claim 30 wherein the step of providing access to the content of the associated safe deposit box further comprises: remotely releasing at least one lock on the associated safe deposit box.

43. A method of remotely acquiring and managing security information for granting access to a remotely operated vault area to only to authorized users comprising the steps of:

establishing at least one database for maintaining user data, remotely registering a user, including acquisition of user-specific data including biometric data, providing a remotely managed console for the user to access when seeking access, and remotely comparing selected user-specific data to the user data stored in the at least one database to verify identity of the user as a basis for granting access to the remotely operated vault area.

* * * * *